E. K. CONOVER.
WIND SCREEN.
APPLICATION FILED JAN. 10, 1907.
917,752.
Patented Apr. 13, 1909.
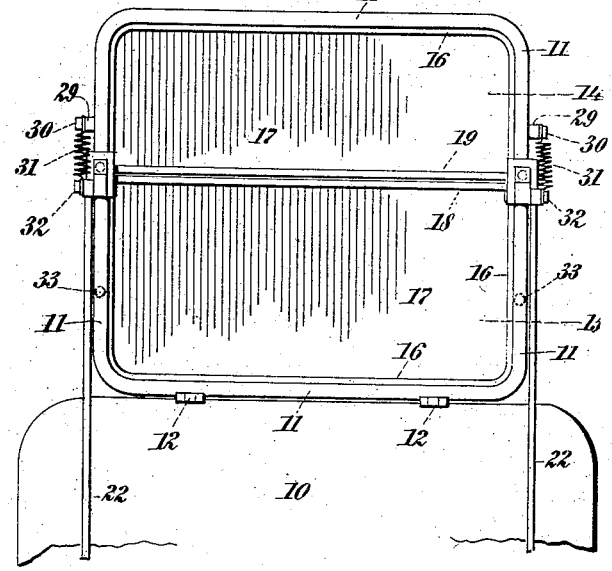
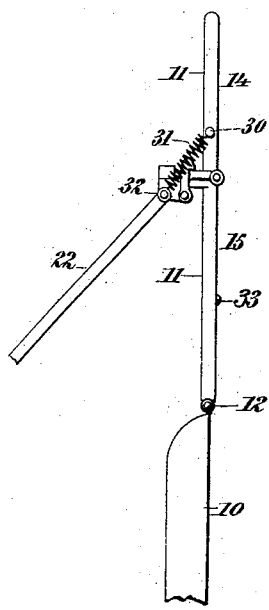
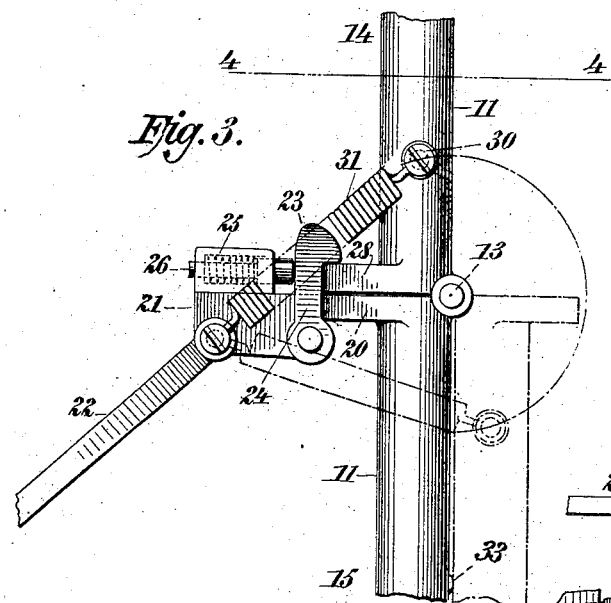
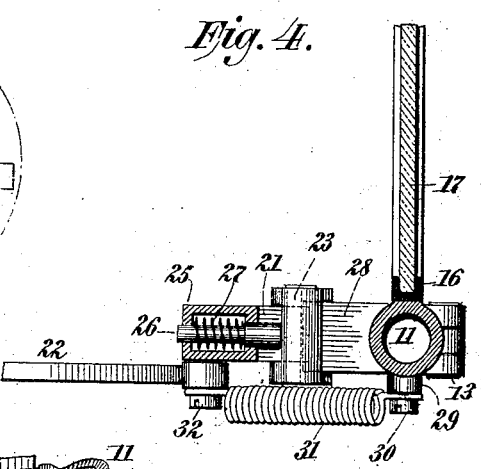
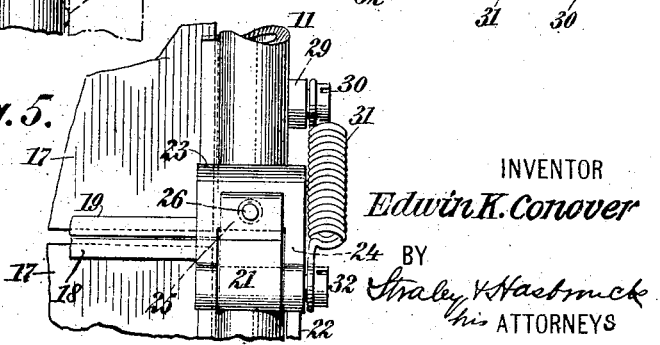
WITNESSES:
Gustave Dieterich
Edwin K. Dietrich
INVENTOR
Edwin K. Conover
BY
Straley & Hasbrouck
his ATTORNEYS

UNITED STATES PATENT OFFICE.

EDWIN K. CONOVER, OF PATERSON, NEW JERSEY, ASSIGNOR, BY MESNE ASSIGNMENTS, TO C. A. MEZGER, INCORPORATED, OF BROOKLYN, NEW YORK, A CORPORATION OF NEW YORK.

WIND-SCREEN.

No. 917,752.   Specification of Letters Patent.   Patented April 13, 1909.

Application filed January 10, 1907. Serial No. 351,625.

*To all whom it may concern:*

Be it known that I, EDWIN K. CONOVER, a citizen of the United States, residing at Paterson, Passaic county, in the State of New Jersey, have invented certain new and useful Improvements in Wind-Screens, of which the following is a full, clear, and exact specification.

My invention relates to improvements in motor vehicles, and the same has for its object more particularly to provide a simple, efficient and reliable wind screen which may be readily applied or secured to the front of a vehicle.

Further, said invention has for its object to provide a folding wind screen which may be folded or adjusted by the driver without necessitating the leaving of his seat.

Further, said invention has for its object to provide a folding wind screen which may be easily adjusted to its raised or lowered position, and automatically locked in either of said positions.

Further, said invention consists in the novel details of construction, and in the combination, connection and arrangement of parts hereinafter more fully described, and then pointed out in the claims.

In the accompanying drawings forming part of this specification wherein like numerals of reference indicate like parts, Figure 1, is a front view of a dash board with a wind screen constructed according to and embodying my invention applied thereto; Fig. 2 is a side view thereof; Fig. 3 is an enlarged detail side view showing the construction of the joint uniting the two parts of said screen, and the means for holding said parts to their adjusted positions; Fig. 4 is a section taken on the line 4—4 of Fig. 3, and Fig. 5 is a detail front view of the joint and holding means shown in side view at Fig. 3.

In said drawings 10 designates the dash board of a vehicle and 11 the wind screen which may be secured at its lower edge to the top edge of said dash board 10 by means of hinges 12, 12 or other suitable fastening devices.

The screen consists of a rectangular, tubular frame 11, made in two parts hinged together at 13, 13, thus dividing said screen into an upper part or section 14, and a lower part or section 15. Upon the inner side of each of said tubular frame parts, 11, 11, is secured a channel bar 16 which is conformed to said parts and adapted to receive a glass plate 17, which is secured therein by a transverse channel bar 18 which engages the upper edge of said glass plate 17. The opposite ends of said transverse channel bar 18 are secured to the ends of the channel bar 16 arranged upon the inner side of the lower frame part 11. The upper screen part 14 is constructed like the lower part 15 except that the glass plate 17 therein is engaged at its lower edge and held by a transverse channel bar 19 secured at its opposite ends to the ends of the channel bar 16 arranged within the upper part 14. The upper ends of the frame of the lower part 15 are each provided with a flat forwardly extending member 20 having a depending portion 21 at its outer end to which is secured the upper end of a guy-rod or brace 22, having its lower end secured to the vehicle body or frame.

23 denotes a detent or latch which is arranged adjacent to the flat, horizontal portion of the member 20, and is bifurcated to form ends 24, 24 which straddle the depending portion 21 of said member 20, and are pivotally secured thereto.

Upon the upper side of the depending member 21 is provided a casing 25 in which is mounted a bolt 26 whose rearward projecting end is adapted to be held under tension against the outer surface of the detent or latch 23 by a spring 27 disposed upon and surrounding the portion of the bolt 26 within the casing 25 in order to maintain the front surface of said detent or latch in contact with the edge of the flat, horizontal portion of the member 20.

The lower ends of the upper frame part 14 are each provided with a flat, horizontal foot 28 arranged at right angles to said frame part and extending forwardly therefrom. Each of said flat, horizontal feet 28 conforms in outline with the flat horizontal portion of the member 20, and is adapted to rest upon the same and be locked in position thereon by the detent or latch 23 when said upper screen part 14 is adjusted to its vertical position. Upon the outer sides of the frame of the upper part 14 adjacent to the hinges 13, 13 are provided studs 29, 29 to which are secured by screws 30, 30 the upper ends of coil springs 31, 31 having their lower ends secured to the screws 32, 32 whereby the upper ends of the guy-rods or braces 22, 22 are secured to the members 20, 20.

33, 33, denote buffers of rubber or other suitable material arranged upon the rear of the frame of the lower part 15 which serve to prevent the rattling of the upper part 14 upon the lower part 15 when adjusted to its folded position.

The springs 31, 31, serve to hold the upper screen part firmly against the buffers 33, 33 when the upper screen part is adjusted to its folded position, and said springs 31, 31 coöperate with the latches 23, 23 to hold the upper screen part to its raised position as illustrated in the drawings.

In order to lower the upper screen part it simply becomes necessary to grasp the upper frame part at or near its upper edge and by a sharp movement release the latches 23, 23, (which have slightly rounded ends) of their engagement with the feet 28, 28 of said upper screen part, and then lower said part rearwardly. When fully lowered it will be held in position against the lower part 15 by the springs 31, 31, as indicated by dotted lines at Fig. 3. To raise the upper screen part it simply becomes necessary to reverse the aforesaid operation.

It will be observed that in order to change the screen it does not become necessary to adjust any fastening devices preliminary to the raising or lowering of the screen, and that no adjustment of parts is necessary to hold the hinged part in either of its positions, and that changes in the position may be readily and quickly effected without requiring the driver to leave his seat. It will also be seen that the devices for holding the upper section are entirely automatic in their operation and are operated through the medium of the upper part of the screen; or in other words that instead of being operated by movement applied to them directly by the driver of the vehicle they are operated by the movement of the upper part of the screen.

Having thus described my invention, what I claim and desire to secure by Letters Patent is:

1. A wind screen for vehicles comprising a rigid section and a hinged section, spring means arranged at the junction of said rigid and hinged sections for maintaining said hinged section in either of its vertical positions upon said rigid section, and means coöperating with said spring means for locking said hinged section in one of its vertical positions upon said rigid section, substantially as specified.

2. A wind screen for vehicles comprising a rigid section and a hinged section, spring means arranged partly upon said rigid section and partly upon said hinged section for maintaining said hinged section in either of its vertical positions, and a locking device adapted to automatically engage and hold said hinged section upon the adjustment of said hinged section to its raised vertical position, substantially as specified.

3. A wind screen comprising a rigid section and a hinged section, spring means for holding said hinged section under tension in either of its vertical positions, and a locking device coöperating with said spring means for securing said hinged section to its raised position upon said rigid section, substantially as specified.

4. A wind screen for vehicles comprising a rigid section and a hinged section secured thereto, spring means arranged at the junction of said hinged sections and secured partly to said rigid section and partly to said hinged section for holding said hinged section under tension in either of its vertical positions, and a locking device coöperating with said spring means arranged upon said rigid section and adapted to engage said hinged section to hold said hinged section locked to its raised vertical position upon said rigid section, substantially as specified.

5. A wind screen for vehicles comprising a rigid section and a hinged section secured thereto, a spring arranged at the junction of said hinged sections having one end secured to said rigid section, and its other end secured to said hinged section for maintaining said hinged section under tension in either of its vertical positions upon said rigid section, and a spring-actuated locking device arranged upon said rigid section and adapted for engagement with said hinged section, said spring-actuated locking device coöperating with said spring to hold said hinged section locked to its raised vertical position upon said rigid section, substantially as specified.

6. A wind screen for vehicles comprising a rigid section and a hinged section secured thereto, a spring-actuated locking device on said rigid section adapted to engage a member on said hinged section, and spring means coöperating with said spring actuated locking device for holding said hinged section in position thereon, substantially as specified.

7. A wind screen for vehicles comprising a rigid section and a hinged section secured thereto, a detent mounted on said rigid section, a member on said hinged section adapted to be engaged thereby, and spring means independent of said detent but coöperating therewith for holding said hinged section in position upon said rigid section, substantially as specified.

8. A wind screen for vehicles comprising a rigid section and a hinged section secured thereto, projections arranged at the abutting hinged portions of said sections, a detent pivotally secured to one of said sections and adapted to engage the projection on the other of said sections, and spring means independent of said detent but coöperating therewith to hold said projections together, substantially as specified.

9. A wind screen for vehicles comprising a rigid section and a hinged section provided at their abutting hinged portions with registering projections adapted for contact with each other, a spring-pressed detent pivotally secured to the projection on one of said sections and adapted for engagement with the projection on the other of said sections for holding the ends of said projections in contact, substantially as specified.

10. A wind screen for vehicles comprising a rigid section and a hinged section provided at their abutting hinged portions with projections, a spring-pressed detent pivotally secured to the projection on one of said sections and adapted for engagement with the projection on the other of said sections, and a spring having one of its ends secured to a laterally projecting support on one of said sections, and its other end secured to the other of said sections, substantially as specified.

11. A wind screen for vehicles comprising a frame consisting of two sections hinged together and provided at their abutting hinged ends with angular projections, a detent pivotally secured to one of said projections and adapted to engage the other of said projections, a spring-pressed member bearing against said detent, and a spring having one end secured to the projection on one of said sections and its other end to the other section adjacent to the hinged portion thereof, substantially as specified.

12. A wind screen for vehicles comprising a frame consisting of two sections hinged together and provided at their abutting hinged ends with flat, angular projections, the projection on one of said sections terminating in a depending end, a detent having a forked lower end straddling said depending end and pivotally secured thereto adjacent to the ends of said angular projections, a casing arranged upon said depending portion, a bolt arranged in said casing having one end adapted to contact with said detent, a spring arranged upon said bolt within said casing for holding said bolt normally pressed against said detent, and a spring having one end secured to said depending portion, and its other end secured to the frame of the other screen section adjacent to its hinged portion, substantially as specified.

13. In an automobile wind shield, the combination of a lower part, means for mounting it in an upright transverse plane on the automobile in front of the occupant, a transparent upper part forming an extension of the lower part and mounted to swing in a direction from and toward the driver to extended or folded position and an automatically releasable holding means connected to a member independent of said upper part and joined to said upper part and serving to hold it in either of its said adjustments, the holding means automatically releasing and following the upper part to either side of the center of its said swinging motion, whereby the shield may be adjusted by direct pressure on its upper part without manipulating the holding means.

14. In an automobile wind shield, the combination of a lower part, means for mounting it upright on the automobile in front of the occupant, a transparent upper part forming an extension of the lower part and mounted to swing with respect to the lower part to assume either active or inactive position and an automatically extensible and contractible means for holding the upper part in either of said positions, such means being mounted at one end by a fixed pivot independent of the upper part of the shield and having its other end connected to said upper part to swing with the same to opposite sides of the center of such swinging motion, whereby said extensible and contractible means automatically follow the motion of the upper part and permit adjustment of the shield by pressure on its upper part without manipulation of such holding means.

Signed at the city of New York, in the county and State of New York, this 21st day of December, nineteen hundred and six.

EDWIN K. CONOVER.

Witnesses:
  CONRAD A. DIETERICH,
  A. R. ANGUS.